(12) United States Patent
Gourley

(10) Patent No.: US 8,536,827 B2
(45) Date of Patent: Sep. 17, 2013

(54) MOBILE ELECTRONIC DEVICE AC CHARGER MOUNT

(76) Inventor: James Robert Gourley, Dallas, TX (US)

( * ) Notice: Subject to any disclaimer, the term of this patent is extended or adjusted under 35 U.S.C. 154(b) by 0 days.

(21) Appl. No.: 13/592,213

(22) Filed: Aug. 22, 2012

(65) Prior Publication Data

US 2012/0318941 A1    Dec. 20, 2012

Related U.S. Application Data

(62) Division of application No. 12/699,556, filed on Feb. 3, 2010.

(51) Int. Cl.
*H02J 7/04* (2006.01)
*H02J 7/00* (2006.01)
*E04G 3/00* (2006.01)
*F16M 11/00* (2006.01)
*A47G 29/00* (2006.01)
*A47G 23/02* (2006.01)
*A45D 19/04* (2006.01)
*A47J 47/16* (2006.01)
*G06F 13/00* (2006.01)

(52) U.S. Cl.
USPC ........... 320/107; 320/112; 320/113; 320/114; 710/303; 710/304; 248/274.1; 248/126; 248/127; 248/146; 248/176.1

(58) Field of Classification Search
USPC ................. 320/111, 112, 113, 114, 115, 116, 320/107
See application file for complete search history.

(56) References Cited

U.S. PATENT DOCUMENTS

| | | | | |
|---|---|---|---|---|
| 6,687,513 | B1* | 2/2004 | Hsu Li .......................... | 455/557 |
| 8,054,042 | B2* | 11/2011 | Griffin et al. .................. | 320/115 |
| 2003/0137276 | A1* | 7/2003 | Lin ................................ | 320/115 |
| 2008/0019082 | A1* | 1/2008 | Krieger et al. ................ | 361/679 |
| 2009/0015198 | A1* | 1/2009 | Brandenburg ................ | 320/115 |
| 2009/0237031 | A1* | 9/2009 | McSweyn et al. ............ | 320/114 |
| 2010/0315036 | A1* | 12/2010 | Liao .............................. | 320/107 |
| 2012/0048755 | A1* | 3/2012 | Tsao ............................. | 206/320 |

* cited by examiner

*Primary Examiner* — Edward Tso
*Assistant Examiner* — Alexis Boateng
(74) *Attorney, Agent, or Firm* — James R. Gourley; Carstens & Cahoon, LLP

(57) ABSTRACT

A device for mounting a mobile electronic device to an alternating current charger is provided. The mount allows the user to charge a mobile electronic device with the alternating current charger provided by the original equipment manufacturer of the mobile electronic device. The mount also protects the mobile electronic device from damage.

7 Claims, 3 Drawing Sheets

MOBILE ELECTRONIC DEVICE AC CHARGER MOUNT

CROSS REFERENCE TO RELATED APPLICATION

This application is a divisional of co-pending U.S. patent application Ser. No. 12/699,556, filed Feb. 3, 2010, entitled "Mobile Electronic Device AC Charger Mount," the technical disclosure of which is hereby incorporated by reference in its entirety.

BACKGROUND OF THE INVENTION

1. Technical Field

The present invention relates to an apparatus for mounting a mobile electronics device to an AC charger.

2. Description of Related Art

Mobile electronics devices which are commercially available include cellular telephones, music players, and GPS navigation systems. Such mobile electronics devices are typically powered by at least one rechargeable internal battery, which must be periodically recharged from an external power source. Most commonly, these rechargeable mobile devices include a charger that facilitates the transfer of power from the alternating current (AC) outlets found in homes and businesses, into the batteries of these devices as direct current (DC) electricity (an "AC charger").

A typical AC charger will include a plurality of metal prongs (the number depending on the country and type of AC outlets available) protruding from a housing. The prongs plug into the AC outlet. The housing is typically made of a rigid material, such as a hard plastic, and houses electrical components (or circuitry) that receive AC power from the metal prongs and convert (or transform) the AC electricity coming from the AC outlet into DC electricity, which is used to charge the batteries in most mobile electronic devices. The electrical circuitry inside the housing may also include components that monitor certain conditions (such as voltage change or charging time) and modify or terminate charging conditions to achieve optimal battery charge. The AC charger will also typically include a charging cable electrically connected to the circuitry inside the housing. Some AC chargers have a charging cable that cannot be easily disconnected from the charger and electrical circuitry, while others have a charging cable connected by a plug and jack or other similar connection which can be easily connected and disconnected by the user. The end of the cable opposite the charger is capable of being electrically connected to the mobile electronic device using a plug and jack or other similar electrical connection to facilitate the transfer of power from the AC outlet, through the AC charger and charging cable, to the internal battery of the mobile electronic device.

SUMMARY OF THE INVENTION

The present invention is directed to a method and apparatus for removably mounting a mobile electronic device to its AC charger. In one embodiment, the apparatus is a mount comprising an attaching member adapted to removably attach said mount to an AC charger, wherein said AC charger comprises an AC charger housing, and a holding member adapted to physically support substantially all weight of a mobile electronic device by said AC charger when said AC charger is plugged into a wall AC outlet. In another embodiment, the apparatus is a mount comprising an attaching member adapted to attach said mount to an AC charger, wherein said AC charger comprises an AC charger housing, a holding member adapted to physically support substantially all weight of a mobile electronic device by said AC charger when said AC charger is plugged into a wall AC outlet, a first electrical connector adapted to connect to a DC power outlet on said AC charger, and second electrical connector adapted to connect to a DC power inlet on said mobile electronic device, wherein said first electrical connector and said second electrical connector are in electrical communication.

In one embodiment, the apparatus attaches to the AC charger by an inwardly biased attaching member. In another embodiment, the holding member is a cradle adapted to removably attach a mobile electronic device to the mount.

The invention surprisingly overcomes several problems that have not been solved in the prior art, including the long felt need for a way to protect a mobile electronic device while it is charging by an AC charger. The solution disclosed and claimed herein provides superior performance to devices known in the art, but at extremely lower cost than devices known in the art.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The present invention relates to an apparatus for removably mounting a mobile electronic device to an AC charger. In one embodiment, the mount of the present invention is adapted to removably attach to the housing of an AC charger by way of an attaching member, and has a holding member adapted to hold a mobile electronic device while the device is charging. In another embodiment, the mount has an attaching member and a holding member, and incorporates a first connector, which mates with the DC outlet connector on the AC charger housing, and which is in electrical communication with a second connector adapted to mate with a DC power inlet connector on the mobile electronic device.

Figure 1:
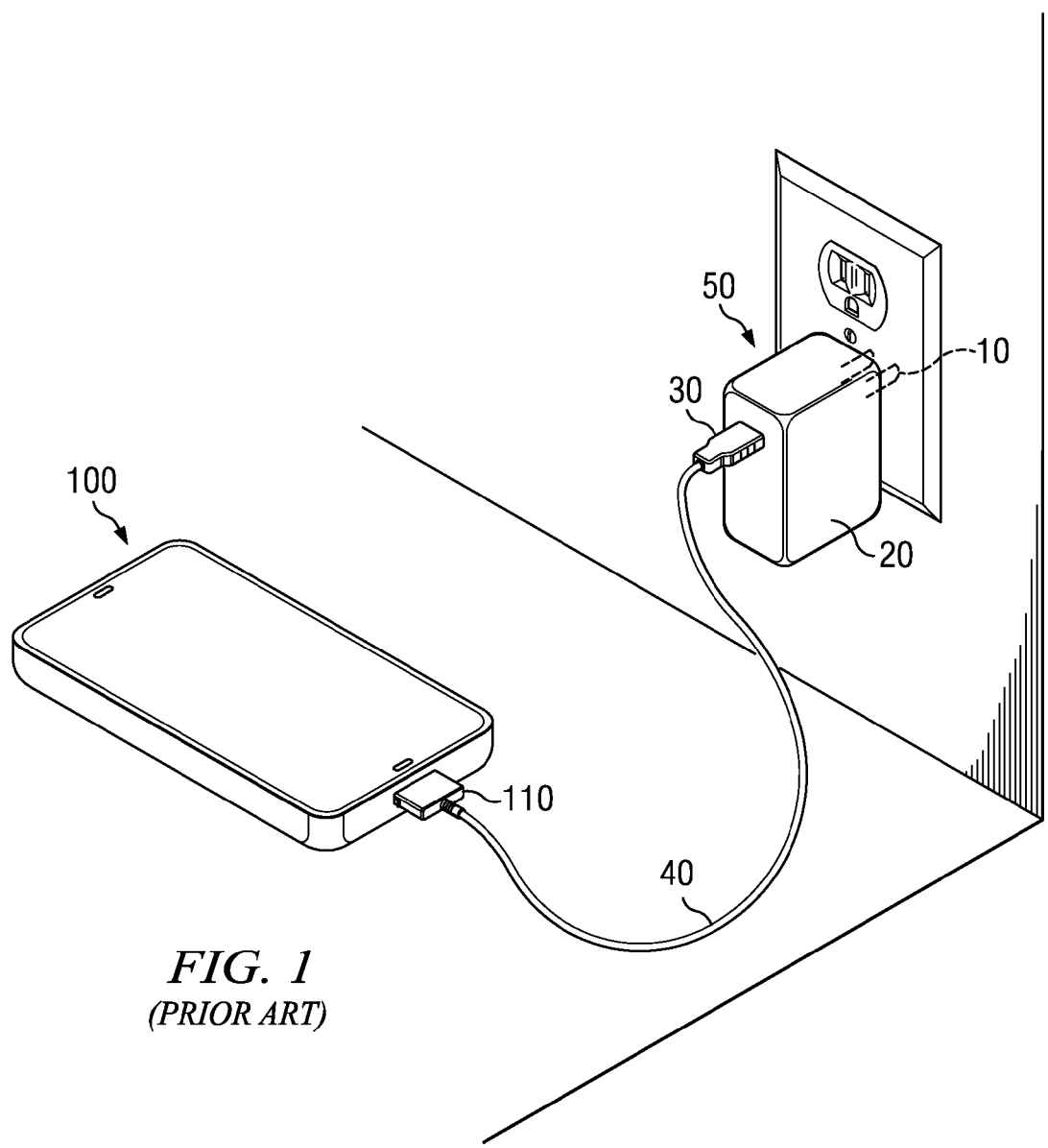
FIG. 1 is a depiction of a prior art OEM AC charger for a mobile electronic device.

All embodiments of the present invention are designed to work in conjunction with an existing AC charger for a mobile electronic device. FIG. 1 depicts a prior art AC charger 50 for a mobile electronic device 100 (specifically, a mobile telephone). Therein is depicted the charger housing 20, with two electrical prongs 10 protruding from it. FIG. 1 also depicts a charging cable 40 in electrical communication with the DC outlet connector 30 of the AC charger 50 and the DC power inlet connector 110 of the mobile electronic device.

At least one AC charger of the type depicted in FIG. 1 is typically provided to the consumer by the original equipment manufacturer (OEM) of a mobile electronic device when it is purchased. Although many aftermarket (non-OEM) AC chargers are available for purchase, there are advantages to using the OEM AC charger. First, the consumer can be sure the OEM AC charger was specifically designed by the OEM to work well with the particular device purchased by the consumer. The designers of the OEM AC charger will likely fully understand how the device works, and even possess non-public knowledge regarding how the internal components of the mobile electronic device function. As such, the OEM is in a far better position to produce a reliable AC charger which is fully compatible with the mobile electronic device. Second, at least one OEM AC charger is typically provided to the consumer at no charge along with the mobile electronic device. Therefore, an aftermarket AC charger may cost more, yet be less reliable, than an OEM AC charger.

There are also some drawbacks to using both OEM and aftermarket AC chargers. AC outlets found in the walls of homes, hotel rooms, businesses, and other structures, are oftentimes not found in the most convenient location to allow the user to plug the AC charger into the wall, and allow the charging device to rest on a table, chair, or other surface off the floor as it charges. The floor is not a desirable resting surface for the charging device for many reasons, including health and cleanliness concerns, or fear of the device suffering accidental damage while on the floor. Also, the locations of the wall AC outlet and the best resting surface for the charging device may be arranged such that even if it were possible to rest the mobile device on a suitable surface, the charging cable stretching from the housing to the mobile device may obstruct a passageway or thoroughfare, causing further risk of accidental damage to the mobile device or AC charger. The present invention overcomes these drawbacks of using an AC charger with a mobile device in a way that the market has not provided to date.

Figure 2A:
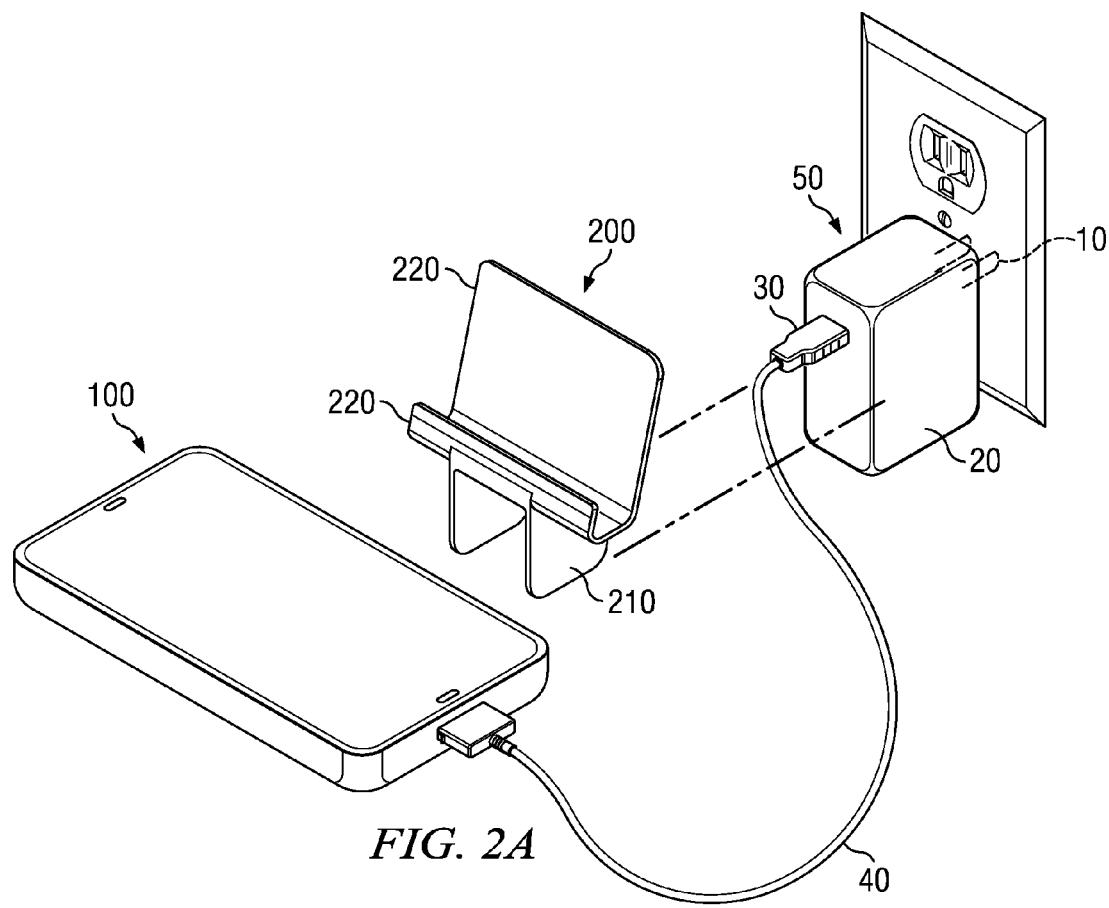
FIG. 2A is an exploded view of one embodiment of the present invention.
Figure 2B:
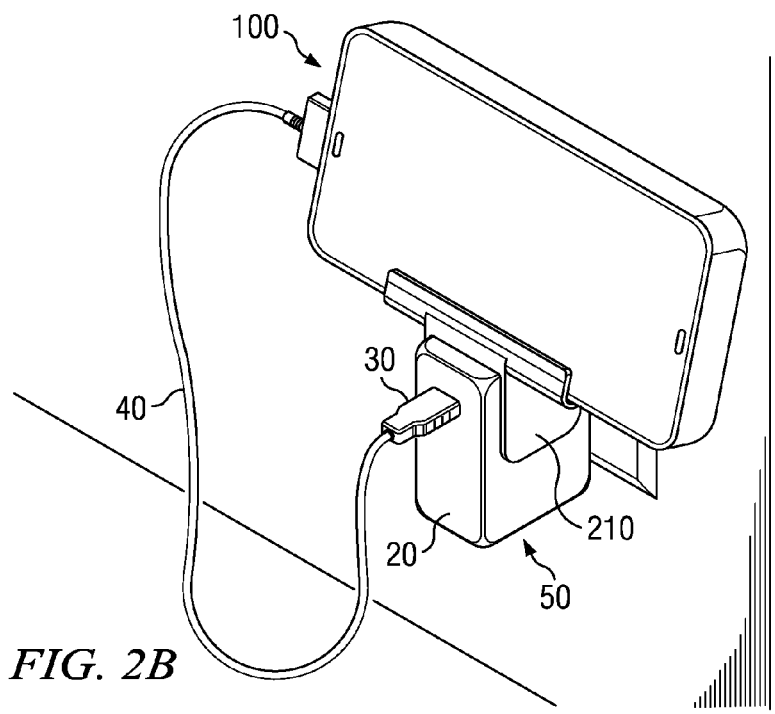
FIG. 2B is a perspective view of one embodiment of the present invention in use with a mobile electronics device.

FIGS. 2A and 2B depict two views of one embodiment of the present invention being used in conjunction with the AC charger shown in FIG. 1. Therein is depicted a mount 200 designed to removably mount a mobile electronic device 100 to an AC charger 50. A mobile electronics device is "mounted" to an AC charger when the AC charger and mount physically support substantially the entire weight of the mobile electronic device when the AC charger is plugged into a wall AC outlet. The mount may also use a portion of the wall for additional mounting support. In one embodiment, the mount includes an attaching member 210 adapted to engage the AC charger housing 20 and attach the mount 200 to the AC charger 50. As used herein, the term "attached" means physical attachment such that when the mount is attached to the AC charger, the AC charger supports substantially all of the weight of the mount when the AC charger is plugged into a wall AC outlet. The term "attached" means more than mere electrical connection between the mount and the AC charger. The mount also includes a holding member 220 designed to engage the mobile electronic device 100, hold it in close proximity to the AC charger 50, and physically support substantially all of the weight of the mobile electronic device by the AC charger housing and mount when the mount is attached to the AC charger and the AC charger is plugged into a wall AC outlet.

In the embodiment depicted in FIGS. 2A and 2B, the attaching member 210 is a clip which is adapted to attach the mount to the AC charger by abutting an upper surface and two opposing side surfaces of the charger housing 20. In one embodiment, the attaching member is inwardly biased. In the context of FIGS. 2A and 2B, the clip prongs which engage the two opposing side surfaces of the charger housing 20 are inwardly biased in order to attach the mount to the AC charger by putting external pressure on the charger housing 20. The inward bias can be provided by any suitable means. For example, one or more springs (not shown) can provide the inward bias. Alternatively, the attaching member could be inwardly biased during manufacture of the mount by intentionally curving or slanting flexible prongs towards the charger housing, such that they resistively flex outwardly when the mount is attached to the charger housing. Also, one or more compressible and/or high friction pads can be placed on the attaching member 210 where it contacts the AC charger housing 20.

In a preferred embodiment, the mount of the present invention also has the characteristic of being "removably attachable." As that term is used herein, a mount is "removably attachable" or "removably attached" or adapted to "removably attach" when it can be attached and removed from the charger housing by the user without disrupting the functionality of the AC charger. The embodiment depicted in FIGS. 2A and 2B is adapted to removably attach the mount to the AC charger housing because the mount comprising the attaching member and holding member can be slid off the housing by a user by pulling the mount away from the housing until the attaching member fully disengages the housing, all while the mobile electronic device is connected by the charging cable to the AC charger and charging. Alternatively, hook-and-loop or non-permanent adhesive fasteners placed at appropriate locations can be used to adapt a mount to removably attach to an AC charger housing. Other suitable means of adapting a mount to removably attach to an AC charger can also be used.

In the embodiment depicted in FIGS. 2A and 2B, the holding member 220 comprises a cradle defined by a back support plate and a front lip, wherein the back plate and front lip extend outward from a resting surface on which the mobile electronic device sits. In another embodiment, the holding member comprises at least two sets of prongs designed to hold the mobile electronic device. The holding member is inwardly biased in one embodiment. In the context of FIGS. 2A and 2B, the back plate and/or the front lip can be inwardly biased in order to apply enough pressure to the device to hold it in place. In another embodiment, the front lip is hinged to allow its inward bias to be adjusted by the user. In one embodiment, the holding member is a clip. Alternatively, the holding member can provide little or no pressure on the mobile electronic device and provide only a stable base or cradle on which the device sits. The holding member can also comprise any suitable holding structure. If the front and back of the mobile electronic device are the sides of the mobile electronic device which are supported by the prongs or plates, the prongs or lip supporting the front side of the device could be shorter than the prongs or plate supporting the back side, in order to allow a user to operate the device using buttons located on its front side while the device is mounted on the AC charger.

The holding member can be constructed to engage the mobile electronic device in any suitable arrangement. Although the device depicted in FIGS. 2A and 2B is shown engaging the mount on its side, the configuration and dimensions of the mobile electronic device and AC charger may allow a mount to be constructed with a holding member that supports the device upright or at an angle. The holding member may also use any suitable mechanical means to removably mount the mobile electronics device to the AC charger. For example, the holding member can comprise one or more hooks disposed below, beside, or on the front face of the AC charger housing, said hooks being designed as a cradle to hold the mobile electronics device in the hook recess when placed there and until removed by the user.

The embodiment depicted in FIGS. 2A and 2B is designed to work with a mobile electronic device which is being charged by an AC charger using a charging cable 40. Thus, the holding member in this embodiment is constructed such that when the device is mounted on the AC charger, the charging cable connector 30 on the device is unobstructed such that a charging cable connected to the mobile electronic device's DC power input connector can remain connected to the device without physical interference from the mount. This embodiment is useful with, at least, OEM AC chargers which have either a charging cable which cannot be easily disconnected from the housing, or a charging cable which can be easily disconnected from the housing. It allows the user to remove the mobile device from the mount and manipulate the device within the range of the charging cable while the device is charging.

In one embodiment, the mount is adapted to attach to a predetermined AC charger and hold a predetermined mobile electronic device by manufacturing the mount with specific physical dimensions. In another embodiment, the holding member and/or attaching member is adjustable in order to accommodate mobile electronic devices and AC chargers of different sizes.

Figure 3A:
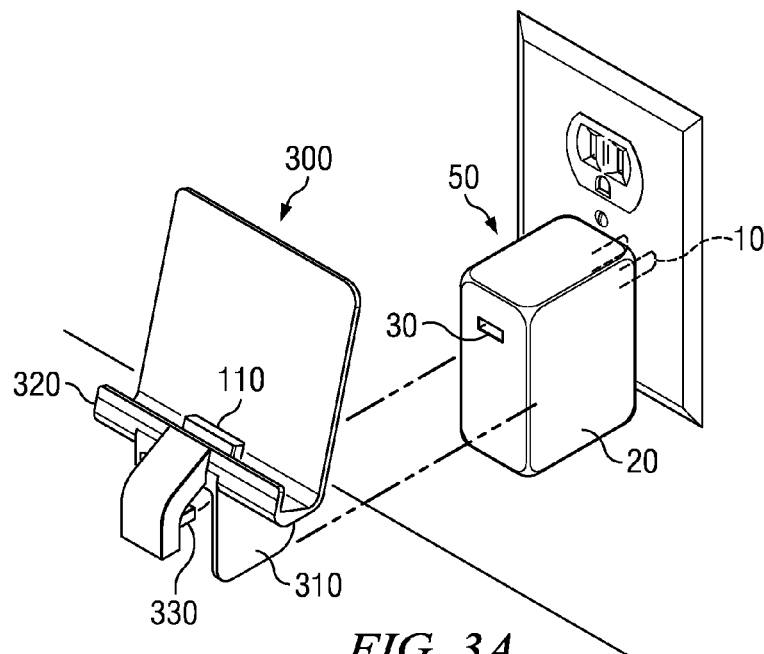
FIG. 3A is an exploded view of another embodiment of the present invention.
Figure 3B:
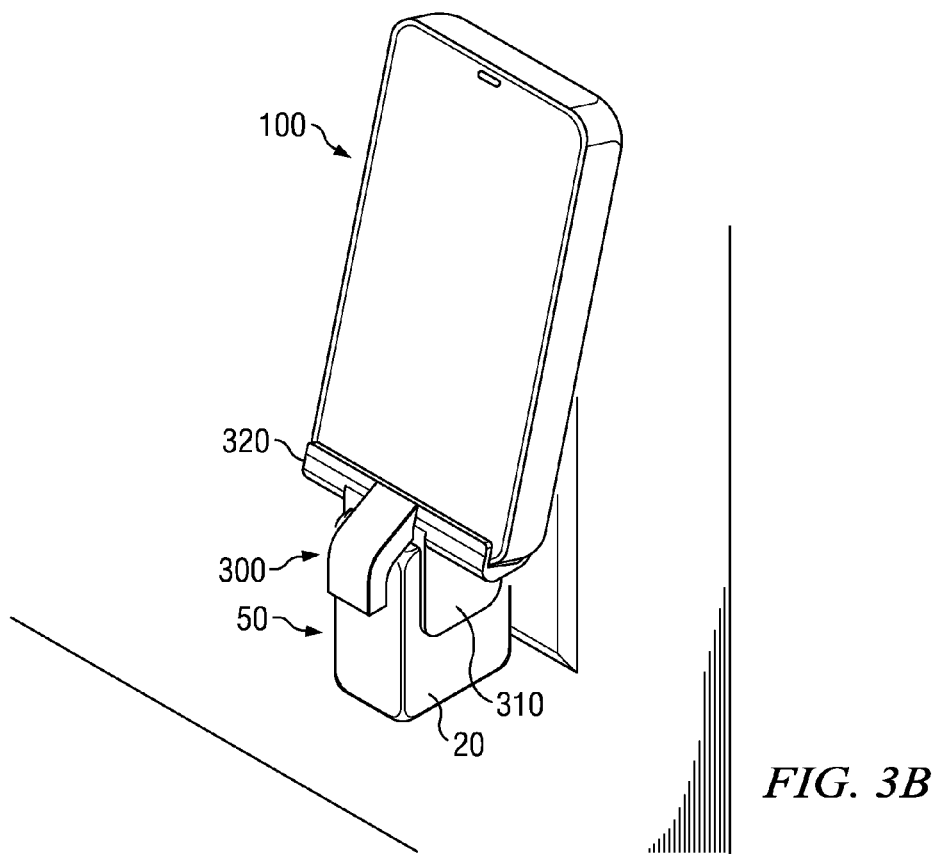
FIG. 3B is a perspective view of another embodiment of the present invention in use with a mobile electronics device.

In another embodiment of the present invention, depicted in FIGS. 3A and 3B, the mount is designed to attach to an AC charger that otherwise uses an easily detachable charging cable (in other words, a charging cable connected to the AC charger by a plug and jack connection, or similar) to charge the mobile electronic device. In the prior art charger depicted in FIG. 1, when the charging cable 40 is disconnected from the housing 20, the charger 50 has an available female DC outlet connector 30 (sometimes referred to as a socket, receptacle, or jack) which is utilized by the mount embodiment of FIGS. 3A and 3B. As depicted in FIGS. 3A and 3B, the mount 300 includes a male electrical connector 330 (sometimes referred to as a plug) which corresponds to the open female DC outlet connector 30 on the AC charger housing when the mount is attached to the charger by the attaching member 310. Alternatively, if the charger 50 has an available male connector when the charging cable is disconnected, then the mount will include a corresponding female connector, or if the connector on the AC charger is neither male nor female, the connector on the mount is designed to mate with the available connector on the AC charger using whatever means are used by that particular connector to form an electrical connection. Generally, the connector 330 which is adapted to mate with the available connector 30 on the AC charger 50 is referred to herein as the "first electrical connector."

In another aspect of the embodiment depicted in FIGS. 3A and 3B, the mount also includes a second electrical connector 110 designed to mate with the DC power inlet connector used by the mobile electronic device to charge it. The second electrical connector is in electrical communication with the first electrical connector by means of suitable wiring (not shown). In a preferred embodiment, the second electrical connector 110 will be integral to the holding member 320. Generally, the mount 300 electrically connects the mobile electronic device 100 to the AC charger 50 in order to charge the mobile electronic device 100 while it is mounted on the mount 300 and while the mount 300 is attached to the AC charger by the attaching member. Some mobile electronic devices utilize standard electrical connectors to charge the device, such as regular, mini, or micro Universal Serial Bus connectors. Other devices use special "dock connectors" to charge the device. In any case, the mount provides the appropriate electrical connectors and wiring to form an electrical connection between the mobile electronic device and the AC charger using the specific type of electrical connector used by the device and the charger.

The structure of the attaching member 310 and holding member 320 in the embodiment depicted in FIGS. 3A and 3B are guided by the same principles as those that govern the structure of the embodiment depicted in FIGS. 2A and 2B. In addition, the attaching member must allow the first electrical connector 330 to be connected to the DC power outlet connector 30 of the AC charger 50 before, coincident with, or after the mount is attached to the charger housing by the attaching member. In a preferred embodiment, the first electrical connector 330 is located and oriented such that the first electrical connector 330 is connected to the DC power outlet connector 30 coincident with the attachment of the mount 300 to the AC charger 50. In the embodiment depicted in FIGS. 3A and 3B, the connection is made as the connectors are substantially aligned and the mount is moved forward towards the AC charger. Likewise, the holding member 320 must allow the second electrical connector 110 to be connected to the DC power inlet connector of the mobile electronic device 100 before, coincident with, or after the device engages the holding member. In a preferred embodiment, the mounting member acts like a "docking station" or "dock" and connects the second electrical connector 110 to the DC power inlet connector coincident with the device's engagement of the mount.

The embodiment depicted in FIGS. 3A and 3B allow the mobile electronic device to be charged by an OEM (or aftermarket) AC charger with a removable cord, with or without the cord, as desired by the user. If a suitable surface is available on which the mobile device can rest while it is charging, or if the user desires to manipulate the mobile electronic device at a location remote from the AC power outlet while the device is charging, the user can charge the mobile device using the charging cable. If a suitable resting surface is unavailable, or if the user wants to avoid the dangers associated with having cables at or near the floor level, the user can use the mount of the second embodiment of the present invention (depicted in FIGS. 3A and 3B) to charge the device. These advantages of flexibility are in addition to the advantages obtained by using the mount of the present invention in conjunction with an OEM AC charger, as described above.

In another embodiment, the mount incorporates a member designed to stabilize the AC charger against the wall while supporting the extra weight of the mobile electronic device. In particular, if the wall outlet does not provide enough support to hold the AC charger in place while it is supporting the weight of the mobile electronic device, a wall support member can be incorporated into the mount. The wall support member is at least one extension from the mount (not shown) that touches the wall when the AC charger is plugged into a wall AC outlet. The wall support member resists rotation of the mount away from the AC outlet and resists disengagement of the AC charger from the wall outlet.

AC chargers do exist in the marketplace which allow a mobile electronics device to charge in close proximity to the charger housing without the use of a charging cable. An example of such a device is the reviveLITE made by Scosche Industries, which is designed to charge an Apple iPhone. However, such a solution has a number of drawbacks in comparison with the present invention. First, if a user desires the flexibility of using or not using a charging cable to charge a mobile device, the user must purchase and carry two different AC charging units. By stark contrast, the present invention allows maximum flexibility with one AC charging unit. The first embodiment of the present invention allows a mobile device to be charged in close proximity to the AC charging unit, but also allows the user to disengage the mobile device from the mount while it is charging through the charging cable and manipulate the device. This is not possible with the reviveLITE device. The second embodiment of the present invention allows the user the same flexibility as the first embodiment by simply detaching the charging cable from the charger and mobile device, attaching the mount to the charger housing, and then engaging the mobile device with the mount (and vice versa). Using the second embodiment of the mount of the present invention also frees the charging cable to be utilized elsewhere, especially when the charging cable is a general purpose cable, or when the charging cable can be used to charge a second mobile electronic device of the same or similar type by plugging it into an alternate power source, such as a personal computer DC power outlet (for example, a USB outlet). By contrast, the reviveLITE provides no such functionality.

Second, the aftermarket charging circuitry used inside the reviveLITE device (like many aftermarket charging circuitries) is not recognized by the iPhone software or hardware, and when the user plugs the iPhone into the reviveLITE charger, the iPhone typically displays a message stating that the device is incompatible with the iPhone, and recommends turning the iPhone into "Airplane Mode" which does not allow the device to access the cellular network. If the iPhone is not turned onto Airplane Mode, it can cause interference and a "buzzing" sound. One user of the reviveLITE has stated that it sounded "like my phone will fry" when the iPhone was plugged into the reviveLITE device. (See top product review at http://store.apple.com/us/product/TW778VC/A). Although the inventor of the present invention has no personal experience with the specific reviveLITE device, he does have experience with other aftermarket (non-OEM) iPhone chargers, and has routinely seen the warning message regarding incompatibility displayed and followed the advice given to turn the iPhone on Airplane Mode, and heard the interference caused by such devices when the iPhone is not turned onto Airplane Mode. The inventor herein has never seen such a warning message when using the OEM AC charger with the iPhone. In Airplane Mode, the device cannot send or receive telephone calls or data over the cellular network, which can be a serious inconvenience while the device is charging. The present invention overcomes this problem present in the art by using the OEM charging circuitry to charge the device and, in one embodiment, mounting the mobile electronic device in close proximity to the AC charger using only mechanical means, or in another embodiment providing both physical support to the device and the electrical connection that makes the charging possible. In the second embodiment, the mobile device still recognizes the charger as the OEM charger because the circuitry and signals sent to the device are identical to the circuitry and signals sent under OEM conditions. The mount merely provides the electrical connection (along with the physical support characteristic of all embodiments of the present invention).

Third, the apparatus of the present invention can provide better performance than the reviveLITE and other similar devices, but at a far lower cost. In all embodiments, the charging circuitry contained in the OEM AC charger, and the charging cable, is not included in the cost of manufacturing the present invention because the user provides the AC charger and cable. The second embodiment of the present invention will be slightly more expensive than the first embodiment because the second embodiment provides the electrical connection between the AC charger and mobile electronic device, but the connection is much shorter and none of the AC/DC power transforming circuitry or other circuitry found inside the reviveLITE device is needed. Again, the lower cost mount of the present invention avoids all of the problems associated with prior art devices, and provides more flexibility and greater performance than prior art devices.

It will now be evident to those skilled in the art that there has been described herein a mount for removably attaching a mobile electronic device to an AC charger while it is charging. Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

I claim:
1. A mount comprising:
   an attaching member adapted to removably attach said mount to an AC charger without disrupting AC charger functionality, wherein said AC charger comprises an AC charger housing;
   a holding member adapted to physically support substantially all weight of a mobile electronic device by said AC charger when said AC charger is plugged into a wall AC outlet, wherein said mount does not provide an electrical connection between said AC charger and said mobile electronic device.
2. The mount of claim 1 wherein said attaching member is adapted to removably attach said mount to an OEM AC charger.
3. The mount of claim 1 wherein said holding member is a cradle.
4. The mount of claim 1 wherein said attaching member is a clip.
5. The mount of claim 1 wherein said attaching member is inwardly biased towards said AC charger housing.
6. The mount of claim 1 wherein said holding member is adapted to hold said mobile electronic device above a top surface of said AC charger housing.
7. The mount of claim 1 wherein said holding member is at least one hook.

* * * * *